United States Patent
Rabasco et al.

(10) Patent No.: US 11,472,921 B2
(45) Date of Patent: Oct. 18, 2022

(54) ALKYLENE OXIDE POLYMER ENDCAPPED WITH AN ARYL ETHER ALKOXYLATE BLOCK COPOLYMER

(71) Applicant: Rohm and Haas Company, Collegeville, PA (US)

(72) Inventors: John J. Rabasco, Allentown, PA (US); Daniel A. Saucy, Harleysville, PA (US); Antony K. Van Dyk, Blue Bell, PA (US)

(73) Assignee: Rohm and Haas Company, Collegeville, PA (US)

( * ) Notice: Subject to any disclaimer, the term of this patent is extended or adjusted under 35 U.S.C. 154(b) by 251 days.

(21) Appl. No.: 16/778,327

(22) Filed: Jan. 31, 2020

(65) Prior Publication Data

US 2020/0262975 A1 Aug. 20, 2020

Related U.S. Application Data

(60) Provisional application No. 62/806,280, filed on Feb. 15, 2019.

(51) Int. Cl.
| | | |
|---|---|---|
| *C08G 65/48* | (2006.01) | |
| *C08K 3/013* | (2018.01) | |
| *C08G 18/83* | (2006.01) | |
| *C08G 65/44* | (2006.01) | |
| *C09D 7/43* | (2018.01) | |
| *C08K 3/22* | (2006.01) | |
| *C08K 3/30* | (2006.01) | |

(52) U.S. Cl.
CPC ........... *C08G 65/48* (2013.01); *C08G 18/831* (2013.01); *C08G 65/44* (2013.01); *C08K 3/013* (2018.01); *C08K 2003/2241* (2013.01); *C08K 2003/3045* (2013.01); *C09D 7/43* (2018.01)

(58) Field of Classification Search
CPC .... C08G 65/22; C08G 65/26; C08G 65/2612; C08G 65/2627
See application file for complete search history.

(56) References Cited

U.S. PATENT DOCUMENTS

| | | | |
|---|---|---|---|
| 4,855,383 A | 8/1989 | Dammann et al. | |
| 7,217,761 B2 | 5/2007 | Ruhlmann et al. | |
| 7,550,542 B2 | 6/2009 | Bakeev et al. | |
| 8,859,684 B2 | 10/2014 | Chu et al. | |
| 2005/0150418 A1 | 7/2005 | Bakeev et al. | |
| 2011/0257326 A1* | 10/2011 | Jaunky | C09D 5/027 524/539 |
| 2013/0149456 A1* | 6/2013 | Bowe | C09D 133/06 427/393 |
| 2015/0119525 A1 | 4/2015 | Rabasco et al. | |
| 2018/0355107 A1* | 12/2018 | Daugs | C09D 7/63 |

FOREIGN PATENT DOCUMENTS

| | | |
|---|---|---|
| EP | 2455412 | 5/2012 |
| EP | 2653463 | 10/2013 |
| EP | 2653464 | 10/2013 |
| EP | 3421520 | 1/2019 |

OTHER PUBLICATIONS

Search report from corresponding European 20157280 application, dated Apr. 17, 2020.

* cited by examiner

*Primary Examiner* — Robert S Jones, Jr.
(74) *Attorney, Agent, or Firm* — Reid S. Willis

(57) ABSTRACT

The present invention relates to a compound comprising a hydrophobically modified poly(oxyalkylene-urethane) having a hydrophobic fragment represented by Structure I:

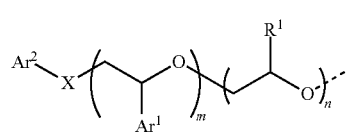

where $Ar^1$, $Ar^2$; $R^1$, m, and n are defined herein. The compound of the present invention provides viscosity stability upon tinting for paints containing a hydrophobically modified poly(oxyalkylene-urethane) rheology modifier, more particularly a HEUR rheology modifier.

7 Claims, No Drawings

ALKYLENE OXIDE POLYMER ENDCAPPED WITH AN ARYL ETHER ALKOXYLATE BLOCK COPOLYMER

BACKGROUND OF THE INVENTION

The present invention relates to an alkylene oxide polymer endcapped with an aryl ether alkoxylate block copolymer, which is useful for improving viscosity retention of tinted coatings formulations.

Hydrophobically modified alkylene oxide polymers, more particularly hydrophobically modified ethylene oxide urethane polymers (HEURs) are preferred rheology modifiers for paints because of the combination of good flow and sag resistance they provide. However, a long-standing weakness of standard HEURs is that the viscosity of a HEUR-thickened paint typically decreases significantly when colorant is added. This undesirable effect is particularly troublesome for medium and deeply tinted paints. The loss of viscosity makes the paint too "thin" and, in particular, the sag resistance becomes unacceptably low, leading to runs and drips on the wall and/or a very poor roller stipple pattern. Accordingly, it would be an advance in the art of tinted paints to find a HEUR-containing paint formulation with improved viscosity retention upon addition of colorant.

SUMMARY OF THE INVENTION

The present invention addresses a need in the art by providing a compound comprising a hydrophobically modified alkylene oxide polymer having a hydrophobic fragment represented by Structure I:

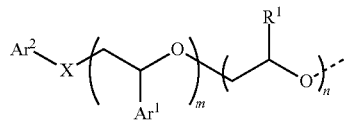

where the dotted line represents the point of attachment of the fragment to the hydrophobically modified alkylene oxide polymer; $Ar^1$ is unsubstituted phenyl, naphthyl, phenyl-O—$CH_2$—, phenyl-$CH_2$—O—$CH_2$—, or naphthyl-O—$CH_2$—; or phenyl, naphthyl, phenyl-O—$CH_2$—, phenyl-$CH_2$—O—$CH_2$—, or naphthyl-O—$CH_2$— substituted with from 1 to 3 $C_1$-$C_6$ alkyl or alkoxy groups; and $Ar^2$ is phenyl, phenyl-$OCH_2CH_2$—, phenyl-$(OCH_2CH_2)_y$—, benzyl, naphthyl, naphthyl-$CH_2$—, naphthyl-$OCH_2CH_2$— or naphthyl-$(OCH_2CH_2)_y$—, wherein the phenyl or naphthyl portion of $Ar^2$ is unsubstituted or substituted with from 1 to 3 $C_1$-$C_6$ alkyl groups; wherein y is from 2 to 10; each $R^1$ is independently H or $C_1$-$C_6$-alkyl; X is O or $NR^2$, wherein $R^2$ is H, $C_1$-$C_6$-alkyl, phenyl, or benzyl; m is from 1 to 20; and n is from 0 to 100. The compound of the present invention addresses a need in the art by providing viscosity stability upon tinting for paints containing a hydrophobically modified alkylene oxide rheology modifier.

DETAILED DESCRIPTION OF THE INVENTION

The present invention is compound comprising a hydrophobically modified alkylene oxide polymer having a hydrophobic fragment represented by Structure I:

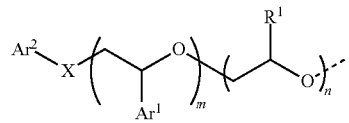

where the dotted line represents the point of attachment of the fragment to the hydrophobically modified alkylene oxide polymer; $Ar^1$ is unsubstituted phenyl, naphthyl, phenyl-O—$CH_2$—, phenyl-$CH_2$—O—$CH_2$—, or naphthyl-O—$CH_2$—; or phenyl, naphthyl, phenyl-O—$CH_2$—, phenyl-$CH_2$—O—$CH_2$—, or naphthyl-O—$CH_2$— substituted with from 1 to 3 $C_1$-$C_6$ alkyl or alkoxy groups; and $Ar^2$ is phenyl, phenyl-$OCH_2CH_2$—, phenyl-$(OCH_2CH_2)_y$—, benzyl, naphthyl, naphthyl-$CH_2$—, naphthyl-$OCH_2CH_2$— or naphthyl-$(OCH_2CH_2)_y$—, wherein the phenyl or naphthyl portion of $Ar^2$ is unsubstituted or substituted with from 1 to 3 $C_1$-$C_6$ alkyl groups; wherein y is from 2 to 10; each $R^1$ is independently H or $C_1$-$C_6$-alkyl; X is O or $NR^2$, wherein $R^2$ is H, $C_1$-$C_6$-alkyl, phenyl, or benzyl; m is from 1 to 20; and n is from 0 to 100.

As used herein, the term "alkylene oxide polymer" refers to water-soluble polyethylene oxide polymers, as well as water-soluble polyethylene oxide/polypropylene oxide and polyethylene oxide/polybutylene oxide copolymers. Preferably, the alkylene oxide polymer is an alkylene oxide urethane polymer, more preferably an ethylene oxide urethane polymer.

As used herein, a hydrophobically modified alkylene oxide urethane polymer refers to a polyethylene, polypropylene, or polybutylene oxide urethane polymer, preferably a polyethylene oxide urethane polymer (a HEUR) modified with the hydrophobe fragment of Structure I.

The fragment of Structure I arises from a capping agent that is conveniently prepared by contacting together under reactive conditions a) a diisocyanate; b) a water-soluble polyalkylene glycol; and c) the capping agent which is a compound represented by Structure II:

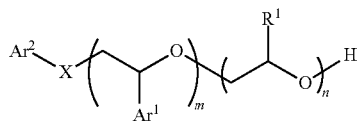

Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane) ($H_{12}$-MDI), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate (TDI), xylene diisocyanate, 4-chloro-1,3-phenylene diisocyanate, 4,4'-methylene diphenyl diisocyanate (MDI), 1,5-naphthylene diisocyanate, and 1,5-tetrahydronaphthylene diisocyanate. Examples of commercially available diisocyanates are Desmodur W cycloaliphatic diisocyanate (DesW) and Desmodur H (HDI).

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having a weight average molecular weight in the range of from 600 to 12,000 Daltons. An example of a suitable polyethylene glycol is PEG 8000, which is commercially available as CARBOWAX™ 8000 Polyethylene Glycol (PEG-8000, a trademark of The Dow Chemical Company ("Dow") or an affiliate of Dow, Midland, Mich.).

The diisocyanate, the polyalkylene glycol, and the capping agent of Structure II are contacted under reaction conditions to form the hydrophobically modified alkylene oxide urethane polymer. Preferably, the weight average molecular weight ($M_w$) of the hydrophobically modified alkylene oxide urethane polymer, as determined by size exclusion chromatography (SEC) as described herein, is in the range of from 2000, more preferably from 4000 Daltons, to preferably 50,000, more preferably to 25,000 Daltons. Examples of preferred subclasses of fragments of the present invention are represented by the following structures:

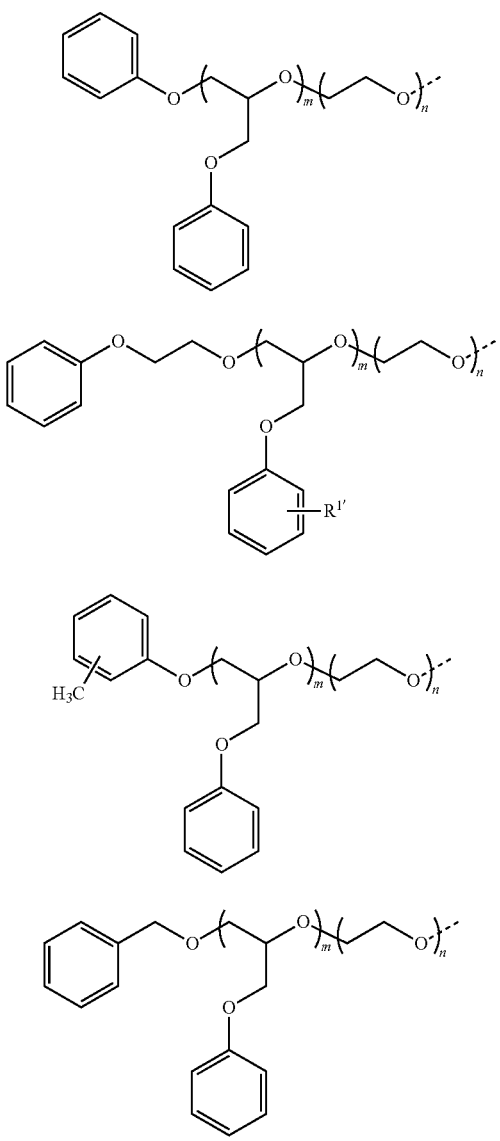

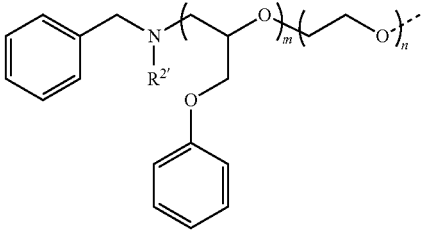

where $R^{1'}$ is H or $CH_3$; and $R^{2'}$ is $CH_3$ or benzyl.

Preferably, $Ar^1$ is phenyl-$OCH_2$— or o-methylphenyl-$OCH_2$—; preferably, when X=O, $Ar^2$ is phenyl, benzyl, phenyl-$OCH_2CH_2$—, or o-methylphenyl; preferably, when X=$NR^2$, $Ar^2$ is benzyl or phenyl; and $R^2$ is benzyl, methyl, or ethyl. Preferably, m is in the range of from 1, more preferably from 2, to 10, more preferably to 6; and n is in the range from 0 to 40. Preferably, each $R^1$ is independently H, methyl, or ethyl; more preferably H or methyl; most preferably each $R^1$ is H. Preferably, X is O, N—$CH_3$, N-phenyl, or N-benzyl.

Preferably, the number average molecular weight ($M_n$) of the fragment of Structure I (and the compound of Structure II) as determined by matrix-assisted laser desorption/ionization-mass spectrometry (MALDI-MS), as described in the Example section herein below, is in the range of from 500 g/mol, more preferably from 750 g/mol, to 10,000, more preferably to 2500 g/mol, and most preferably to 1500 g/mol.

The compound of Formula II can be conveniently prepared by first contacting an aryl alcohol or an aryl amine with an aryl epoxide or aryl glycidyl ether in the presence of a catalytic amount of a suitable base, such as KOH, under conditions sufficient to prepare an aryl alkoxy ether oligomer intermediate, then preferably contacting the intermediate with an alkylene oxide, such as ethylene oxide, under conditions sufficient to form the desired compound of Formula II. Preferably, the aryl alcohol is phenol, a cresol, or phenoxyethanol, or a combination thereof; the aryl amine is preferably N-methylbenzyl amine or dibenzyl amine, or a combination thereof; and the aryl alkoxy ether is preferably phenyl glycidyl ether or cresyl glycidyl ether or a combination thereof.

The compound of the present invention is advantageously solubilized in water with various other additives to prepare an aqueous thickener composition. The aqueous thickener composition comprises from 1, and more preferably from 5, to 60, and more preferably to 40 weight percent thickener solids, based on the total weight of the aqueous thickener composition. Other additives may be included in the aqueous thickener composition to suppress the viscosity of the aqueous thickener composition. Such other additives include water miscible solvents such as propylene glycol and diethylene glycol butyl ether. Examples of other additives include cylcodextrins and various nonionic and anionic surfactants. Examples of preferred nonionic surfactants include $C_6$-$C_{18}$ alcohol ethoxylates, lauryl alcohol ethoxylates, guerbet alcohol ethoxylates, and castor oil ethoxylates. Surfactants under the TERGITOL™ tradename (A Trademark of The Dow Chemical Company or Its Affiliates) are also suitable.

Examples of suitable anionic surfactants include $C_6$-$C_{18}$ alcohol sulfates, sulfonates, sulfosuccinates, phosphates, as well as their ethoxylates, including sodium lauryl sulfate, sodium 2-ethylhexyl sulfate, sodium dodecylbenzene sulfonate, and sodium dioctyl sulfosuccinate.

For the compound of the present invention where $X=NR^2$, sufficient acid is preferably added to the corresponding aqueous thickener composition to adjust its pH to a range of from 2.1 to 6.0.

Any acid compound that can lower the pH to this range is suitable. Examples of preferred acids include, gluconic acid, phosphoric acid, hydrochloric acid, sulfuric acid, lactic acid and poly(acrylic acid)s.

The compound of the present invention is useful as a rheology modifier in tinted coatings formulations. In another embodiment, the present invention is a composition comprising an aqueous dispersion of a) 10 to 60 weight percent, based on the weight of the composition, of polymer particles; b) and from 0.05 to 2 weight percent, based on the weight of the composition, of a hydrophobically modified alkylene oxide urethane polymer having the hydrophobic fragment of structure I.

The aqueous dispersion of polymer particles (that is, the latex) is preferably a dispersion of polymer particles comprising structural units of an acrylate or a methacrylate monomer or a vinyl ester monomer or combinations thereof.

The term "structural unit" of the named monomer refers to the remnant of the monomer after polymerization. For example, a structural unit of methyl methacrylate is as illustrated:

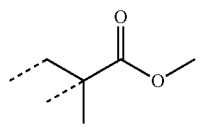

where the dotted lines represent the points of attachment of the structural unit to the polymer backbone.

Preferably, the polymer particles comprise at least 30, more preferably at least 50 weight percent structural units of acrylate and methacrylate monomers or preferably comprise at least 30, more preferably at least 50 weight percent structural units of a vinyl ester monomer. Examples of suitable acrylate and methacrylate monomers include methyl methacrylate, ethyl methacrylate, butyl methacrylate, ureido methacrylate, ethyl acrylate, butyl acrylate, 2-ethylhexyl acrylate, and 2-propylheptyl acrylate. Preferred combinations of acrylate and methacrylate monomers include methyl methacrylate and one or more monomers selected from the group consisting of ethyl acrylate, butyl acrylate, ureido methacrylate, 2-propylheptyl acrylate, and 2-ethylhexyl acrylate.

More preferred combinations of acrylic monomers include methyl methacrylate and butyl acrylate; methyl methacrylate and 2-ethylhexyl acrylate; and methyl methacrylate, butyl acrylate, and ethyl acrylate, with the combination of methyl methacrylate and butyl acrylate being most preferred. Examples of vinyl ester-based monomers include vinyl acetate and vinyl versatates. An example of a vinyl ester-based copolymer is vinyl acetate-ethylene (VAE).

The polymer particles may also include structural units of other monomers such as styrene, acetoacetoxyethyl methacrylate, acrylonitrile, acrylamide, and 2-acrylamido-2-methylpropane sulfonic acid. Additionally, the polymer particles preferably comprises from 0.2, more preferably from 0.5, and most preferably from 1 weight percent, to preferably 5, and more preferably to 3 weight percent structural units of an ethylenically unsaturated carboxylic acid monomer such as acrylic acid, methacrylic acid, or itaconic acid.

The composition of the second aspect of the present invention may be contacted with a colorant at a sufficient concentration to impart the desired color. As used herein, "colorant" refers to a liquid dispersion of a colored pigment. The concentration of colorant is generally present in the range of from 5 to 20 volume percent of the total volume of the paint and colorant. Examples of colored pigments include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds, carbon black, lampblack, black iron oxide, yellow iron oxide, brown iron oxide, and red iron oxide.

In another aspect, the composition comprises less than 15 PVC of $TiO_2$ or $BaSO_4$ particles; in yet another aspect, the composition comprises less than 10 PVC of $TiO_2$ and $BaSO_4$ particles. For deep base formulations, the PVC of $TiO_2$ and $BaSO_4$ particles is <1. PVC is defined by the following formula:

$$PVC = \left[\frac{Vol(\text{Pigment} + \text{Extender})}{Vol(\text{Pigment} + \text{Extender} + \text{Binder Solids})}\right] \times 100$$

where binder solids refers to the contribution of polymer from the aqueous dispersion of the polymer particles that bind the pigment and extender particles together.

The composition may further include any or all of the following materials: binders, dispersants, pigments, defoamers, surfactants, solvents, extenders, coalescents, biocides, and opaque polymers.

EXAMPLES

Molecular Weight Measurements

MALDI-MS $M_n$ Method for Measuring Intermediate Examples Molecular Weights

MALDI mass spectra were acquired on a Bruker Daltonics ultraflex MALDI-TOF mass spectrometer equipped with a nitrogen laser ($\lambda=337$ nm). In the MALDI experiment, 20 mg of 2,5-dihydroxybenzoic acid was dissolved in 1 mL of THF as the MALDI matrix. The sample solution in MeOH was premixed with the matrix solution at a ratio of 1:20. To facilitate ionization of the species in the sample mixture, NaI was added into the sample/matrix mixture. A 0.3 µl sample of the mixture was then placed on the sample plate and was air dried for MALDI-MS analysis. Reflectron mode was selected in the analysis to enhance the resolution of the mass spectra.

SEC Method for Measuring $M_w$ of HEURs

Samples were prepared by dissolving 1-2 mg of polymer per gram of 100 mM ammonium acetate in methanol. Samples were brought into solution by shaking overnight on a mechanical shaker at room temperature. Sample solutions were filtered using 0.45 µm PTFE filter.

Separations were carried out on a Waters Acquity APC system consisting of an isocratic pump, degasser, injector, column oven and both UV and RI detectors operated at 40° C. System control, data acquisition, and data processing were performed using version 3 of Empower software (Waters, Milford, Mass.). SEC separations were performed in 100 mM ammonium acetate in methanol (Optima grade from Fisher) at 0.5 mL/min using an APC column set composed of two Water APC columns (150×4.6 mm ID) packed with BEH Diol particles (pore size marked as BEH 200 Å and BEH 450 Å, particle size 1.7 and 2.5 μm, respectively) purchased from Waters (Milford, Mass.). 20 μL of sample were injected for APC separations.

Twelve-point calibration curve of $3^{rd}$ order obtained from narrow polyethylene oxide (PEO) standards.

Intermediate Example 1—Preparation of a Phenyl Glycidyl Ether Polymer

A 2-L round-bottom flask equipped with a temperature controlled heating mantle, an addition funnel, a reflux/distillation head, and overhead stirrer was charged with phenol (102.44 g, 1.09 moles), toluene (337.83 g), and KOH flakes (8.12 g, 90% pure). The solution was heated under $N_2$ to distil off a portion of the toluene (110 g). Phenyl glycidyl ether (490.78 g, 3.27 moles) was then added to the resulting concentrated solution at 110° C. to 120° C. over 4 h. The mixture was stirred for an additional 2 h and the flask was cooled. The product was treated with acetic acid and the solvent was removed in vacuo to form a distribution of intermediates with an $M_n$ of 780 g/mol as measured by MALDI-MS and that includes a compound with the following structure:

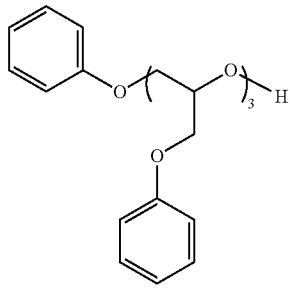

Intermediate Example 2—Preparation of a Phenyl Glycidyl Ether Ethoxylate Block Copolymer A 2-L round-bottom flask equipped with a temperature controlled heating mantle, an addition funnel, a reflux/distillation head, and overhead stirrer was charged with phenol (62.94 g, 0.67 mole), toluene (341.34 g), and KOH flakes (4.75 g, 90% pure). The solution was heated under $N_2$ to distill off a portion of the toluene (82.81 g). Phenyl glycidyl ether (502.18 g, 3.34 moles) was then added to the resulting concentrated solution at 110° C. to 120° C. over 4 h, and the mixture was stirred for an addition 2 h. A portion of the resultant solution (374.9 g) was charged into a conical bottom 2-L Parr reactor. The reactor was sealed, pressure checked, purged with $N_2$, then heated to 120° C. Ethylene oxide (289.3 g) was added at a rate of 1 to 2 g/min. The mixture was held at 120° C. for 1 h, then cooled to 60° C. before unloading the product (650.6 g). The reaction product was treated with acetic acid (1.07 g), and solvent was removed in vacuo to form a distribution of intermediates with an $M_n$ of 1840 g/mol as measured by MALDI-MS and that includes a compound with the following structure:

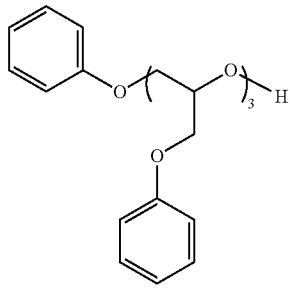

Intermediate Example 3—Preparation of a Phenyl Glycidyl Ether Ethoxylate Block Copolymer A conical bottom 2-L Parr reactor was charged DOWANOL™ EPh (A Trademark of The Dow Chemical Company or its Affiliates, 179.95 g) and 90% potassium hydroxide (3.36 g) and the reactor was sealed, pressure checked, purged with nitrogen, then heated to 100° C. Phenyl glycidyl ether (587 g) was then added to the reactor at a rate of 4 mL/min using a Gilson HPLC pump. Reaction was evident by the heat produced during this addition. Upon completing the addition of phenyl glycidyl ether, the mixture was held overnight at 100° C. The reaction mixture temperature was increased to 120° C. and then ethylene oxide (286.9 g) was added to the reactor at a rate of 1.5 g/min. Upon completing addition of ethylene oxide the reaction mixture was held overnight at 120° C. After cooling the reaction mixture to 80° C., the reactor headspace was purged. The reaction mixture was treated with acetic acid (3.18 g) and the reactor was then unloaded to form to form a distribution of intermediates with a $M_n$=968 g/mol as measured by MALDI-MS and that includes a compound with the following structure:

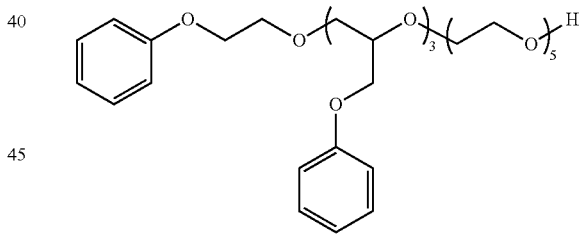

Intermediate Example 4—Preparation of an Amino Phenyl Glycidyl Ether Ethoxylate Block Copolymer A conical bottom 2-L Parr reactor was charged with N-methylbenzyl amine (157.8 g) and 90% potassium hydroxide (3.36 g) The reactor was sealed, pressure checked, and purged with nitrogen, then heated to 100° C. Phenyl glycidyl ether (587 g) was then added to the reactor at a rate of 4 mL/min using a Gilson HPLC pump. Upon completing the addition of phenyl glycidyl ether, the mixture was held overnight at 100° C. The reaction mixture temperature was increased to 120° C. whereupon ethylene oxide (286.9 g) was added to the reactor at a rate of 1.5 g/min. Upon completing addition of ethylene oxide, the reaction mixture was held overnight at 120° C. After cooling the reaction mixture to 80° C., the reactor headspace was purged. The reaction mixture was treated with acetic acid (3.18 g) and the reactor was then unloaded to form a distribution of intermediates with a $M_n$=878 g/mol as measured by MALDI-MS and that includes a compound with the following structure:

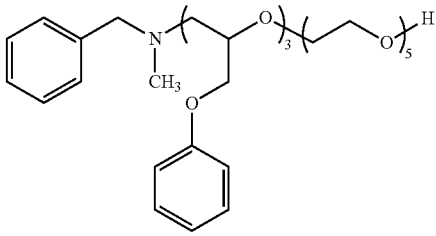

Intermediate Example 5—Preparation of an Amino Phenyl Glycidyl Ether Ethoxylate Block Copolymer A conical bottom 2-L Parr reactor was charged with dibenzyl amine (256.9 g) and 90% potassium hydroxide (3.36 g). The reactor was sealed, pressure checked, and purged with nitrogen, then heated to 100° C. Phenyl glycidyl ether (587 g) was then added to the reactor at a rate of 4 mL/min using a Gilson HPLC pump. Upon completing the addition of phenyl glycidyl ether, the mixture was held overnight at 100° C. The reaction mixture temperature was increased to 120° C., whereupon ethylene oxide (286.9 g) was added to the reactor at a rate of 1.5 g/min. Upon completing addition of ethylene oxide, the reaction mixture was held overnight at 120° C. After cooling the reaction mixture to 80° C., the reactor headspace was purged. The reaction mixture was treated with acetic acid (3.18 g) and the reactor was then unloaded to form to form a distribution of intermediates with a $M_n$=1009 g/mol as measured by MALDI-MS and that includes a compound with the following structure:

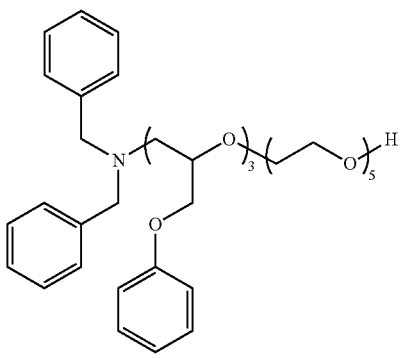

Example 1: Preparation of a Polyaryl Alkoxylate HEUR

A mixture of PEG 8000 (75.0 g) in toluene (150 g) was heated to reflux and dried via azeotropic distillation for 2 h. The reactor was then cooled to 90° C. and Desmodur W cycloaliphatic diisocyanate (Des W, 6.64 g) was added to the reactor with stirring for 5 min. Dibutyl tin dilaurate (0.21 g) was then added and the reaction mixture stirred for 1 h at 90° C. The reaction mixture was cooled to 80° C. and the polyaryl alkoxylate prepared in Intermediate Example 1 (30.56 g) was added to the reactor and the resulting mixture stirred at 80° C. for 1 h. Solvent was removed in vacuo to yield a white solid product. The $M_w$ was found to be 17,298 as measured by SEC as described hereinabove. An aqueous solution containing 20 wt % HEUR polymer and 16 wt % butyl carbitol was prepared prior to adding to the coating formulation.

Example 2: Preparation of a Polyaryl Alkoxylate HEUR

A mixture of PEG 8000 (50.0 g) in toluene (150 g) was heated to reflux and dried by azeotropic distillation for 2 h. The reactor was then cooled to 90° C. and Des W (4.43 g) was added to the reactor with stirring for 5 min. Dibutyl tin dilaurate (0.21 g) was then added and the reaction mixture was stirred for 1 h at 90° C. The reaction mixture was then cooled to 80° C. and the polyaryl alkoxylate prepared in Intermediate Example 2 (47.19 g) was added to the reactor and the resulting mixture stirred at 80° C. for 1 h. Solvent was removed in vacuo to yield a white solid product. The $M_w$ was found to be 17,903 as measured by SEC as described hereinabove. An aqueous solution containing 20 wt % HEUR polymer and 16 wt % butyl carbitol was prepared prior to adding to the coating formulation.

Example 3—Preparation of a Polyaryl Alkoxylate HEUR

A mixture of CARBOWAX™ PEG8000 (75.0 g) in toluene (150 g) was heated to reflux and dried by azeotropic distillation for 2 h. The reactor was then cooled to 90° C. and Des W (7.18 g) was added to the reactor with stirring for 5 min. Dibutyl tin dilaurate (0.21 g) was then added and the reaction mixture was stirred for 1 h at 90° C. The reaction mixture was then cooled to 80° C. and the polyaryl alkoxylate prepared in Intermediate Example 3 (38.59 g) was added to the reactor and the resulting mixture stirred at 80° C. for 1 h. Solvent was removed in vacuo to yield a white solid product. The $M_w$ was found to be 17,609 as measured by SEC described hereinabove. An aqueous solution containing 20 wt % polymer and 16 wt % butyl carbitol had a Brookfield viscosity of 1420 cP (spindle #3, 6 rpm). The polymer can also be dissolved without organic solvent by replacing the butyl carbitol with surfactant. For example, an aqueous solution containing 20 weight percent of the polymer and 20 weight percent of TERGITOL™ 15-S-9 Surfactant (15-S-9) had a Brookfield viscosity of 2800 cP (spindle #3, 6 rpm).

Example 4—Preparation of an Amino Polyaryl Alkoxylate HEUR

CARBOWAX™ 8000 Polyethylene Glycol (PEG; 1200 g) was heated to 110° C. in vacuo in a batch melt reactor for 2 h. Butylated hydroxytoluene (BHT, 0.132 g) and Desmodur W (114.9 g) were then added to the reactor and the reaction mixture was stirred for 5 min. Bismuth octoate (28% Bi, 3.0 g) was then added to the reactor and the resulting mixture was stirred for 10 min at 110° C. Intermediate Example 4 (500.09 g) was then added to the reactor and the resulting mixture stirred for 10 min at 110° C. The resulting molten polymer was removed from the reactor and cooled. An aqueous thickener composition was prepared by dissolving the polymer in water with gluconic acid that contained 20 weight percent polymer solids, 2 weight percent gluconic acid and 78 weight percent water.

Table 1 shows the advantages of using a small amount of an acid such as gluconic acid in aqueous preparations of a HEUR having a hydrophobic fragment of Structure I where $X=NR^2$. The viscosities were measured using a Brookfield viscometer, spindle #3 and 6 rpm.

TABLE 1

Viscosity of Aqueous Solution of Example 4 HEUR with and without Gluconic Acid

| Example 4 Polymer (wt %) | Water (wt %) | Gluconic Acid (wt %) | Aqueous Solution Viscosity (cP) | pH |
|---|---|---|---|---|
| 20% | 80% | 0 | Gel | ~7.9 |
| 20% | 78% | 2% | 3309 | 3.62 |

TERGITOL, TAMOL, and RHOPLEX are all Trademarks of The Dow Chemical Company or Its Affiliates.

Example 5—Preparation of a Polyaryl Alkoxylate & Amino HEUR

CARBOWAX™ 8000 Polyethylene Glycol (PEG; 1350 g) was heated to 110° C. in vacuo in a batch melt reactor for 2 h. Butylated hydroxytoluene (BHT, 0.145 g) and Desmodur W (100.53 g) were then added to the reactor and the reaction mixture was stirred for 5 min. Bismuth octoate (28% Bi, 3.38 g) was then added to the reactor and the resulting mixture was stirred for 10 min at 110° C. Intermediate Example 3 (401.86 g) and 2-[bis(2-ethylhexyl)amino]ethanol (19.92 g) were then added to the reactor and the resulting mixture stirred for 10 min at 110° C. The resulting molten polymer was removed from the reactor and cooled. The $M_w$ was found to be 23,518 as measured by SEC described hereinabove. An aqueous thickener composition was prepared by dissolving the polymer in water that contained 20 wt % polymer solids, 20 weight percent 15-S-9 and 60 weight percent water.

Example 6. Preparation of an Amino Polyaryl Alkoxylate HEUR

CARBOWAX™ 8000 Polyethylene Glycol (PEG; 1200 g) was heated to 110° C. in vacuo in a batch melt reactor for 2 h. Butylated hydroxytoluene (BHT, 0.132 g) and Desmodur W (114.9 g) were then added to the reactor and the reaction mixture was stirred for 5 min. Bismuth octoate (28% Bi, 3.0 g) was then added to the reactor and the resulting mixture was stirred for 10 min at 110° C. Intermediate Example 5 (554.95 g) was then added to the reactor and the resulting mixture stirred for 10 min at 110° C. The resulting molten polymer was removed from the reactor and cooled. An aqueous thickener composition was prepared by dissolving the polymer in water with gluconic acid. Table 2 is a recipe for the unthickened tint base paint formulation, that is, the paint without colorant and HEUR rheology modifier.

TABLE 2

Unthickened Tint Base Paint Formulation

| Material Name | Pounds | Gallons |
|---|---|---|
| Grind | | |
| Water | 50 | 6.0 |
| Dow Corning ® 8590 Defoamer | 1 | 0.1 |
| TERGITOL ™ 15-S-9 Surfactant | 4 | 0.5 |
| TAMOL ™ 2011 Dispersant | 1.8 | 0.2 |
| AMP-95 Neutralizer | 1 | 0.1 |
| Minex 7 Extender | 25 | 1.2 |
| Ti-Pure R-706 TiO$_2$ | 25 | 0.8 |
| Water | 34.1 | 4.1 |
| Letdown | | |
| RHOPLEX ™ HG-706 Emulsion | 595.8 | 67.1 |
| Texanol Ester Alcohol | 6.7 | 0.8 |
| Optifilm 400 Film Enhancer | 2.7 | 0.3 |
| DC-8590 Defoamer | 1 | 0.1 |
| Water | 156.1 | 18.7 |

RHOPLEX, and ACRYSOL are all Trademarks of The Dow Chemical Company or its Affiliates.

Paint Tinting Data

Tables 3a and 3b illustrate the KU viscosities for deep base paint formulations prepared as described in Table 2 and separately thickened with a commercial HEUR (ACRYSOL™ RM 995 Rheology Modifier (RM-995), a Trademark of The Dow Chemical Company or its Affiliates, or HEURs of the present invention, and subsequently tinted with 12 oz of Colortrend 808 lamp black. All paints were co-thickened with an ICI builder, ACRYSOL™ RM-3030 Rheology Modifier (RM-3030). The experimental HEUR and RM-3030 amounts are in active lbs/100 gal. Sufficient RM-3030 was used in all the paints to adjust the thickness of the paints to an ICI viscosity in the range of from 1.1 to 1.3 Poise. KU viscosity of the paints were measured at room temperature using a Brookfield KU-1+ viscometer or equivalent KU viscometer.

TABLE 3a

KU Viscosity Data for HG-706 Formulation, Tinted with Lamp Black

| | Paint Series #1 | | | Paint Series #2 | |
|---|---|---|---|---|---|
| Example | RM-995 | Ex. 1 | Ex. 2 | Ex. 3 | RM-995 |
| HEUR (lbs) | 2.13 | 1.56 | 2.83 | 1.97 | 1.98 |
| RM-3030 (lbs) | 8.12 | 7.92 | 7.89 | 7.38 | 7.18 |
| KU before tint | 107 | 114 | 111.5 | 106 | 105 |
| Tinted with 12 oz lamp black | | | | | |
| ΔKU after tint | −21 | −9 | −8 | +1.2 | −23.8 |

TABLE 3b

KU Viscosity Data for HG-706 Formulation, Tinted with Lamp Black

| | Paint Series #3 | | | |
|---|---|---|---|---|
| Example | Ex. 4 | Ex. 5 | RM-995 | Ex. 6 |
| HEUR (lbs) | 2.79 | 1.41 | 1.86 | 1.76 |
| RM-3030 (lbs) | 6.43 | 7.29 | 7.19 | 7.07 |
| KU before tint | 106 | 105 | 107 | 114 |
| Tinted with 12 oz lamp black | | | | |
| ΔKU after tint | −4 | −7 | −27 | −5 |

ΔKU refers to the paint's change in KU viscosity after tinting with lamp black by subtracting the tinted KU viscosity from the paints original KU viscosity prior to tinting.

The HEURs used in the paint formulations of Examples 1-6 exhibit significant improvement in paint KU viscosity stability upon colorant addition. Paint thickened with RM-995, drops as much as 27 KU units upon the addition of 12 oz. Lamp Black colorant to 116 oz of paint base. By comparison, paint thickened with HEUR Example 2 drops by only 8 KU units when tinted, paint thickened with HEUR Example 4 drops by only 4 KU units when tinted, and paint thickened with Example 3 HEUR exhibits a fairly constant KU viscosity when tinted as the KU actually increases slightly by 1.2 KU units.

The invention claimed is:

1. A compound comprising a hydrophobically modified alkylene oxide polymer having a hydrophobic fragment represented by Structure I:

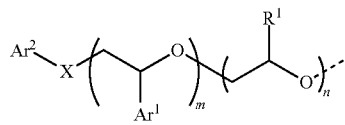

where the dotted line represents the point of attachment of the fragment to the hydrophobically modified alkylene oxide polymer; $Ar^1$ is unsubstituted phenyl, naphthyl, phenyl-O—CH$_2$—, phenyl-CH$_2$—O—CH$_2$—, or naphthyl-O—CH$_2$; or phenyl, naphthyl, phenyl-O—CH$_2$—, phenyl-CH$_2$—O—CH$_2$—, or naphthyl-O—CH$_2$ substituted with from 1 to 3 $C_1$-$C_6$ alkyl or alkoxy groups; and $Ar^2$ is phenyl, phenyl-OCH$_2$CH$_2$, phenyl-(OCH$_2$CH$_2$)$_y$-naphthyl, naphthyl-CH$_2$—, naphthyl-OCH$_2$CH$_2$— or naphthyl-(OCH$_2$CH$_2$)$_y$—, wherein the phenyl or naphthyl portion of $Ar^2$ is unsubstituted or substituted with from 1 to 3 $C_1$-$C_6$ alkyl or alkoxy groups; wherein y is from 2 to 10; each $R^1$ is independently H or $C_1$-$C_6$-alkyl; X is O or NR$^2$, wherein $R^2$ is H, $C_1$-$C_6$ alkyl, phenyl, or benzyl; m is from 1 to 20; n is from 0 to 100; and wherein the hydrophobically modified alkylene oxide polymer is a hydrophobically modified alkylene oxide urethane polymer.

2. The compound of claim 1 wherein $Ar^1$ is phenyl-O—CH$_2$— or o-methylphenyl-O—CH$_2$—; $Ar^2$ is phenyl, phenyl-OCH$_2$CH$_2$—, or o-methylphenyl; each $R^1$ is independently H or CH$_3$; m is from 1 to 10; and n is from 0 to 40.

3. The compound of claim 2 wherein the hydrophobic fragment has a number average molecular weight ($M_n$) in the range of from 500 to 10,000 g/mol; and X is O, or N—CH$_3$, N-phenyl, or N-benzyl; wherein the hydrophobically modified alkylene oxide polymer is a hydrophobically modified ethylene oxide urethane polymer.

4. The compound of claim 3 which wherein the hydrophobic fragment has an $M_n$ in the range of from 500 to 2500 g/mol and is selected from the group consisting of:

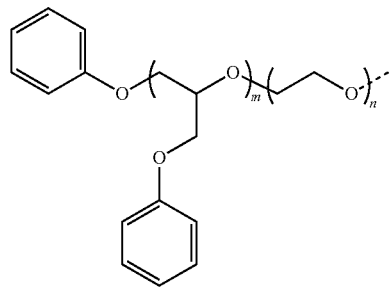

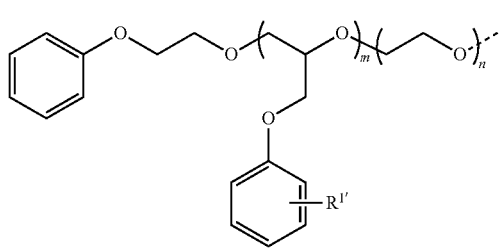

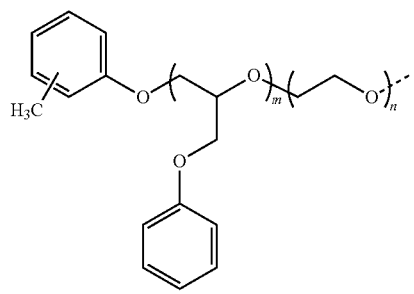

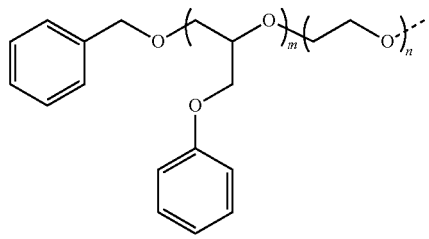

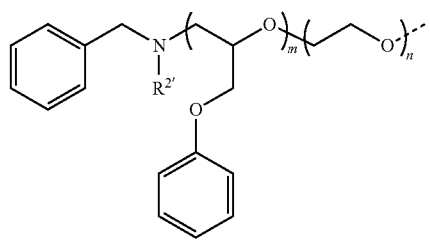

where $R^{1\prime}$ is H or CH$_3$; and $R^{2\prime}$ is CH$_3$ or benzyl.

5. A composition comprising an aqueous dispersion of a) 10 to 60 weight percent, based on the weight of the composition, of polymer particles; and b) from 0.05 to 2 weight percent, based on the weight of the composition, of the compound of claim 1.

6. The composition of claim 5 which comprises less than 10 PVC of TiO$_2$ or BaSO$_4$ particles.

7. The composition of claim 5 which further includes one or more materials selected from the group consisting of binders, dispersants, pigments, defoamers, surfactants, solvents, extenders, coalescents, biocides, and opaque polymers.

* * * * *